United States Patent [19]

Smith et al.

[11] Patent Number: 4,572,336
[45] Date of Patent: Feb. 25, 1986

[54] DISC BRAKE AND ANTI-ROTATIONAL HEAT SHIELD THEREFOR

[75] Inventors: Roger L. Smith, Niles, Mich.; John R. Wegh, South Bend, Ind.

[73] Assignee: Allied Corporation, Morristown, N.J.

[21] Appl. No.: 505,596

[22] Filed: Jun. 20, 1983

[51] Int. Cl.⁴ .............................................. F16D 55/04
[52] U.S. Cl. .............................. 188/72.6; 188/264 G; 188/106 F; 188/370
[58] Field of Search ................ 188/73.31, 264 G, 370, 188/218 A, 106 F, 106 A, 71.6, 73.35, 73.36, 72.6, 72.5; 92/76, 168, 165 PR; 403/155, 397

[56] References Cited

U.S. PATENT DOCUMENTS 3,765,513  10/1973  Brooks ............................ 188/106 F
3,835,961   9/1974  Troester et al. ................ 188/106 F
4,401,012   8/1983  Emmett ........................... 188/264 G

FOREIGN PATENT DOCUMENTS 0003889  5/1979  European Pat. Off. .
1031946  6/1966  United Kingdom .......... 188/264 G

OTHER PUBLICATIONS

Soviet Inventions Illustrated, Sections P., Q., Week 12, Apr. 30, 1980, Derwent Publications' Ltd., London.

Primary Examiner—Bruce H. Stoner, Jr.
Assistant Examiner—Alvin Oberley
Attorney, Agent, or Firm—Ronald D. Welch; Ken C. Decker

[57] ABSTRACT

A disc brake assembly is provided with a plate which cooperates with a pair of pistons to prevent rotation of one of the pistons relative to the caliper. The plate is further designed to act as a heat shield for a boot assembly associated with the piston.

8 Claims, 3 Drawing Figures

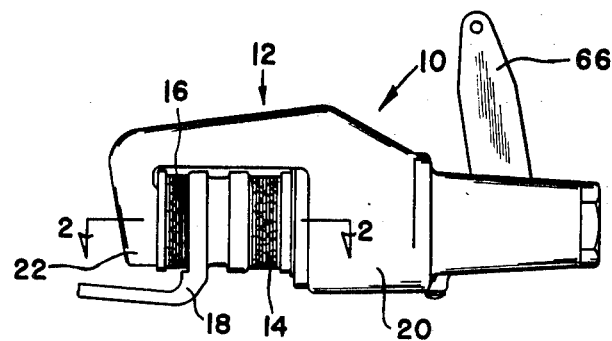
FIG. 1
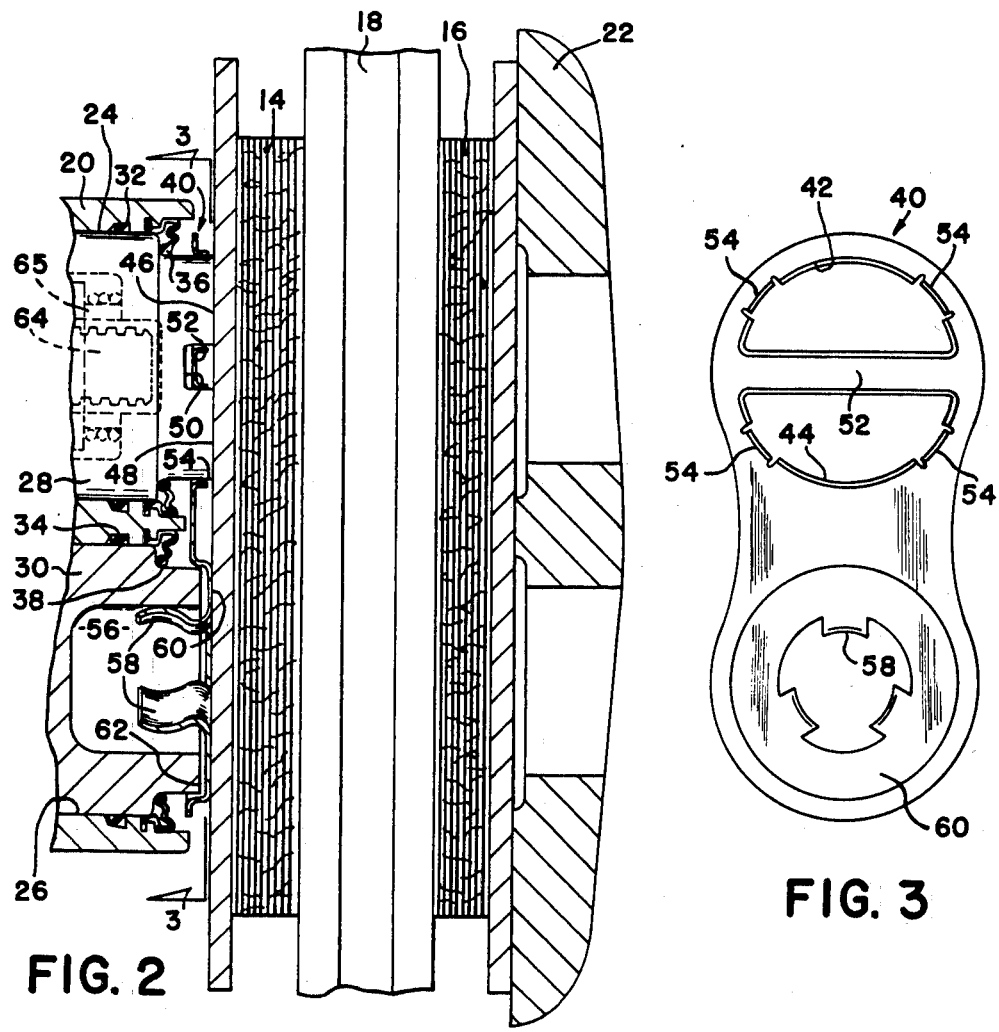
FIG. 2
FIG. 3

DISC BRAKE AND ANTI-ROTATIONAL HEAT SHIELD THEREFOR

BACKGROUND OF THE INVENTION

1. Field of the Invention

This invention relates to a disc brake and a plate therefore wherein a pair of pistons are carried by a caliper to urge a pair of friction pads into engagement with a rotor to be braked. A parking device cooperates with one of the pistons to provide a brake application when a parking brake pedal or the like is applied.

2. Description of the Prior Art

Heretofore, the piston associated with the parking device was slotted so that a key extending into the slot would prevent rotation of this piston when the parking and/or automatic adjustment device was operated. The slots for the piston required extra machining for the latter. As an alternative, it was proposed that this piston could be provided with holes so that pins extending from one of the friction pads could fit in the holes to prevent rotation of this piston. The pins extending into the piston holes rendered friction pad replacement difficult during service for the disc brake. Consequently, it is desireable to provide a simple anti-rotation feature for the disc brake piston associated with the parking and/or automatic adjustment device.

SUMMARY OF THE INVENTION

The present invention provides a disc brake comprising a caliper cooperating with a pair of friction pads to urge the latter into engagement with a rotor to be braked, the caliper including a pair of pistons opposing one of the friction pads, a parking device cooperating with one of the pistons and means substantially preventing rotation of the one device when the parking and/or automatic adjustment device is actuated, characterized in that said means comprises a plate extending between said pair of pistons whereby rotation of said one piston imparts slight rotation to said plate and said other piston opposes the rotation of said plate and said one piston.

BRIEF DESCRIPTION OF THE DRAWINGS

The present invenion is illustrated in one embodiment in FIGS. 1, 2 and 3.

FIG. 1 is an end view of a disc brake,

FIG. 2 is a cross-sectional view taken along line 2—2 of FIG. 1, and

FIG. 3 is a view taken along line 3—3 of FIG. 2.

DESCRIPTION OF THE PREFERRED EMBODIMENTS

A disc brake 10 includes a caliper 12 cooperating with a pair of friction pads 14 and 16 in a conventional manner to urge the latter into engagement with a rotor 18 to be braked. The caliper 12 includes an actuation leg 20 on one side of the rotor opposing pad 14 and a reaction leg 22 on the other side of the rotor opposing pad 16.

As shown more clearly in FIG. 2, the actuation leg 20 defines a pair of bores 24 and 26 movably receiving a pair of pistons 28 and 30. Fluid pressure communicated to the bores 24 and 26 biases the pair of pistons 28 and 30 toward the rotor 18 to engage the pad 14 therewith so that reaction forces acting against the caliper move the latter to engage the pad 16 with the rotor 18. The pistons are sealingly engageable with seals 32, 34 to retain fluid pressure within the bores 24 and 26, respectively. A pair of boot assemblies 36 and 38 extend from pistons 28 and 30, respectively, to the caliper to prevent the ingress of contaminates between the pistons and caliper.

In accordance with the invention, a plate 40 is attached to the pistons 28 and 30 such that the boot assemblies 36 and 38 are shielded by the plate 40 from the heat generated by the friction pad 14 when engaging the rotor 18. The plate 40 is provided with a pair of half-circular openings 42 and 44 receiving bosses 46 and 48 protruding from the piston 28 toward the friction pad 14. The bosses 46 and 48 are separated by a groove 50 and a strip 52 of the plate 40 is disposed in the groove 50 when a plurality of plate tabs 54 engage the bosses 46 and 48 to attach the plate 40 to the piston 28. Conversely, the piston 30 is provided with a cavity 56 facing the friction plate 14 and the plate 40 is provided with a plurality of fingers 58 extending into the cavity to engage the wall of the latter. The plate 40 is further stepped at annular ridge 60 so that the ridge fits over the edge 62 of piston 30 adjacent friction pad 14.

The piston 28 is hollow in order to receive a parking device, shown schematically in phantom at 64 in FIG. 2. In operation, the parking device 64 is rotated via a handle or actuator 66, see FIG. 1, to move the piston 28 via a suitable cam or threaded member. The parking device further cooperates with an automatic adjustment assembly 65 which is operable to accommodate lining wear for the friction pads to retain the latter in close proximity to the rotor. In order to operate the parking device or the automatic adjustment assembly, it is desireable to prevent the piston 28 from rotating relative to the caliper. The plate 40 provides an anti-rotational feature in view of the engagement between the plate 40 and the piston 30 in cooperation with the locking or anti-rotational fit between the plate 40 and the piston 28. A slight rotational force applied to the piston 28 biases the plate 40 to rotate via groove 50 and strip 52; however, the ridge 60 and fingers 58 are prevented from rotating by the piston 30 so that the piston 28 is prevented from rotating.

In view of the foregoing, it is seen that a lightweight plate 40 can be economically stamped to fit or cooperate with both pistons such that a heat shield is provided for the piston boot assemblies and an anti-rotational feature is provided for the one piston carrying a parking device and/or an automatic adjustment.

In the alternative, it is possible for the plate 40 to connect with the friction pad 14 to define an anti rotational connection therebetween.

We claim:

1. A disc brake comprising a caliper cooperating with a pair of friction pads to urge the latter into engagement with a rotor to be braked, the caliper including a pair of pistons opposing one of the friction pads, a parking device cooperating with one of the pistons and means substantially preventing rotation of the one piston when the parking device is actuated, characterized in that said means comprises a plate means extending between said pair of pistons and operatively connected thereto such that rotation of said one piston imparts slight rotation to said plate means and said other piston opposes the rotation of said plate means and said one piston.

2. The disc brake of claim 1 in which said plate means is substantially flexible in the direction of movement for said pair of pistons and substantially rigid in a normal direction thereto to permit movement of said one piston relative to said other piston and retain said plate means in cooperation with said pair of pistons.

3. The disc brake of claim 1 in which said plate means defines an anti-rotational engagement with only said one piston whereby said other piston is free to rotate relative to said plate means.

4. The disc brake of claim 1 in which said plate means extends around the periphery of said pair of pistons to substantially protect a pair of boot assemblies associated with said pair of pistons from excessive heat generated in said one friction pad during braking.

5. The disc brake of claim 1 in which said other piston defines a cavity facing said one friction pad and said plate means extends into said cavity.

6. A disc brake and plate means therefore comprises a caliper cooperating with a pair of friction pads to urge the latter into engagement with a rotor to be braked, the caliper including a pair of pistons directly opposing one of the friction pads, a boot assembly substantially preventing the ingress of contaminants between the caliper and the pistons and the plate means cooperating with the boot assembly to retain the latter substantially spaced from one friction pad, characterized in that said plate means also cooperates with one of said pistons to substantially prevent rotation of said one of said pistons relative to said caliper, said one piston defining a slot adjacent said one friction pad and said plate means being received within said slot to form an anti-rotational fit.

7. The disc brake of claim 6 in which said plate means engages said pair of pistons to prevent a pair of boot assemblies associated with said pair of pistons from contacting said one friction pad, and said plate means engagement with said pair of pistons substantially prevents rotation of said one piston relative to said caliper and substantially prevents rotation of said plate means relative to said one piston.

8. The disc brake of claim 6 in which said other piston forms a cavity facing said one friction pad and said plate means extends into the cavity.

\* \* \* \* \*